United States Patent [19]

Reisacher

[11] 4,025,134

[45] May 24, 1977

[54] HIGH SPEED LUBRICATED BEARING

[76] Inventor: Josef Reisacher, Ostring 18, D6719 Kirchheim, Germany

[22] Filed: Jan. 23, 1975

[21] Appl. No.: 543,303

[30] Foreign Application Priority Data

Jan. 26, 1974 Germany .......................... 2403768

[52] U.S. Cl. ............................ 308/122; 308/237 R
[51] Int. Cl.² ..................... F16C 1/24; F16C 13/04; F16C 33/66; F16C 42/02
[58] Field of Search ................ 308/9, 36.1, 78, 113, 308/121, 122, 123, 124, 125, 237 R, 240

[56] References Cited

UNITED STATES PATENTS

| 2,386,165 | 8/1945 | Landberg ................. 308/237 R X |
| 3,043,636 | 7/1962 | MacInnes et al. ................. 308/121 |
| 3,090,544 | 5/1963 | Woollenweber, Jr. et al. ... 308/122 |
| 3,410,616 | 11/1968 | Dee .................................. 308/122 |

FOREIGN PATENTS OR APPLICATIONS

| 1,255,610 | 1/1961 | France ............................... 308/122 |
| 963,443 | 7/1964 | United Kingdom ............... 308/122 |

Primary Examiner—L. J. Paperner
Assistant Examiner—Howard Beltran
Attorney, Agent, or Firm—Watson, Cole, Grindle & Watson

[57] ABSTRACT

A bearing for high-speed rotors, in particular for turbo-superchargers. The bearing includes a one-piece bearing bush floating in oil in the bearing housing and two bearing supports in axially spaced relation to one another. Each support includes axial bearing surface and a directly adjoining radial bearing surface. The bearing bush has all of its bearing surfaces, damping surface, lubricating oil grooves and ducts, the radial bearing surfaces divided by the asymmetrical arrangement of their lubricating oil grooves into an axially inward narrow and an axially outward large bearing portion.

6 Claims, 3 Drawing Figures

HIGH SPEED LUBRICATED BEARING

BACKGROUND OF THE INVENTION

The present invention relates to bearings for high-speed rotors, in particular for turbo-super-charges including two bearing supports arranged in an axially spaced relation, each having an axial and a radial bearing surface, and a bearing bush non-rotatively maintained and supported on the bearing body by means of external damping surfaces.

In connection with the design of bearings for high-speed rotors, the designers are facing most exacting demands due to a variety of functional, constructional and operational requirements partly contradicting one another. From an operational viewpoint, problems affecting the bearing power loss and bearing stability are of considerable import for the design of similar bearings. With bearings of similar geometrical design features, the bearing power loss is known to be approximately proportionate to the fifth power of the bearing diameter. It accounts for a substantial share of the turbine performance, particularly with small-size turbo-superchargers such as for passenger car and truck engines. Particularly in the low-speed range of the engines, this is apt to have an extremely adverse effect upon the torque and throttle response of the supercharged engines. In addition to the energy dissipated by direct bearing friction, energy is also lost by lubricating oil spattered from members of the rotor, i.e., due to the braking action of such amounts of lubricating oil as are splashed back to the rotor elements. Experience shows that such losses have been comparatively large with conventional bearings for high-speed engines.

However, these shares of losses should be kept as low as possible while at the same time assuring also an adequate stability of the bearings. In order to keep the bearing diameters, and, consequently, the power losses of the bearings, on a low level, in most cases only the third critical speed of rotation of the rotor is higher than the maximum operational speed. At any rate, the bearing strength and the damping power of the bearings inclusive of the external damping of the bearing bush have to be high enough to prevent the build-up of rotor oscillations with the areas of the first and second critical speed of rotation. Only under these circumstances, is it possible to dispense with the customary fine oil filtering and the considerable expense involved.

As regards the structural sizes and structural weights of the turbo-charges, there are generally certain natural limitations imposed thereupon by considerations of engine design, as a result of which the freedom of bearing design is further restricted.

However, with regard to production technique, the designer has to meet ever increasing demands. This is further due to the fact that in view of rapidly expanding legislation in the field of environmental protection, the use of turbo-superchargers for the supercharging of truck engines is constantly increasing. As a result, the energy crisis is bound to lead to a large extent to ever smaller supercharged low-loss engines both for trucks and passenger vehicles and for other types of driving mechanisms. Consequently, future mass production trends will show a tendency towards even minor savings which will produce economical results of decisive importance.

SUMMARY OF THE INVENTION

It is the purpose of the invention to provide a bearing for high-speed rotors, in particular for turbo-superchargers, which avoid the shortcomings of the known compromise solutions of conventional bearings while meeting the previously mentioned requirements to a considerable extent. According to the present invention, the one-part bearing bushing floating in lubricating oil comprises all axial and radial bearing surfaces, damping surfaces, lubricating oil grooves and axial lubricating oil ducts of the bearing, the axial and radial surfaces on both bearing supports adjoining each other directly. The radial bearing surfaces are by means of the axially asymmetric arrangement of their lubricating oil groove divided into an axially inward narrower bearing portion and axially outward wider bearing portion whose share of the surface area is preferably more than 80 percent of the radial bearing surface.

As a result of this design it is possible, at a predetermined axial wheel base of the rotor concerned, to obtain an effective axial distance between the two bearing supports which is considerably larger than the wheel base of known bearings, and to considerably reduce both the external diameter of the axial bearings and the width of the radial bearings, without impairing the bearing and strength and the damping capacity of the bearing unit. This is accompanied by a substantial reduction of the bearing friction losses as revealed chiefly in the lower speed range by an improved throttle response of the associated engine. A bearing of this type distinguishes itself by a longer service life and lesser sensitivity of the bearing against defective maintenance of the lubricating oil.

The bearing and damping capacity of the radial bearings depend both upon the relative speed between the shaft and the bearing and upon the size of the bearing surfaces supplied with oil. The capacity increases with increases in the relative speed between the shaft and the bearing and also with increases in the extent of the undisturbed bearing surfaces that are well supplied with oil. The invention takes advantage of the fact that non-rotating floating bearing bushes having asymmetrically arranged lubricating oil grooves assure maximum bearing and damping capacity of the radial bearings, as a result of which minimum bearing widths and, consequently, the smallest bearing losses are also possible.

According to a preferred embodiment of the invention, the bearing bush is produced from high-quality casting with cast-in lubricating oil grooves and ducts. Such a type of bearing bush with all the necessary recesses for the oil supply makes it advantageously possible to arrange the two bearing supports of the rotor at a considerably larger axial distance from each other than the outer damping surfaces of the bearing. The bearing surfaces are not disturbed by terminating bores and the lubricating oil grooves can be made extremely narrow and radially deep. In addition thereto, the manufacture of the bearing bush from high-quality casting ideally solves the problems of economical bearing production and helps save substantial investments and finishing costs. As compared with conventional types of such bearings a lesser number of individual components is required and finishing of the fitting areas of these elements can be dispensed with. A high degree of finishing precision and surface quality is expected from the bearing surfaces of the single-part bearing bush only and from the individual components of the rotor.

The bearing housing has to be of a considerably lesser quality. The essential portion of finishing requirements for conventional turbo-superchargers, therefore, is located in the bearing bush which carries not only all of the bearing and damping surfaces, the oil supply ducts and grooves, but also the means for the axial and circumferential fixation of the bearing.

According to a further feature of the invention more tha 30 percent of the radial bearing surface and preferably more than 80 percent is axially located outside the external damping surfaces. This produces a high degree of stability of the bearing with an adequate cross-section of stream discharge for the lubricating oil and sufficient damping properties of the bearing without any increase of the axial overall length.

According to the invention, particularly advantageous results have been obtained where the external damping surfaces were more than three times the size of the radial bearing surfaces and split up preferably by an axially asymmetric arrangement of the oil ring grooves provided for their lubrication into an axially interior narrow surface share and an axially exterior larger surface share, the latter amounting preferably to more than 75 percent of the damping surface. As a result of the axially asymmetric splitup of the external damping surfaces higher damping values are achieved as compared with a symmetric design. Large external damping surfaces are by no means a disadvantage from a structural viewpoint because there is sufficient construction space available at this point of the bearing. Moreover, as will be shown later, the large diameter in the area of the damping surfaces offers considerable advantages from a manufacturing viewpoint.

According to another embodiment of the invention a particularly noteworthy advantage can be obtained if at both bearing supports an oil discharge slot, arranged concentrically around the axial bearing surface and open in the direction of an oil outlet chamber is provided, the axial width of which is less than 20 percent of the diameter of the associated radial bearing. The basic idea of this design is as follows: The rate of power input of the lubricating oil splashed off the axial bearings is approximately proportionate to the fourth power of the axial bearing diameter. Since with the last-mentioned design of the bearing according to the invention an oil discharge slot of a very small axial extent joins the outer circumference of the axial bearing, no oil spray can reach the rotor from the oil splashed off the axial bearing, and a desirable, speed-dependent underpressure is produced by the splashing oil on the nearby shaft packings formed by piston rings for example, as compared with the adjacent oil discharge chambers. At the same time, the width of the oil discharge slot should be such as to produce the required underpressure indispensible to produce oil tightness. Thus the energy of the splashed lubricating oil is definitely used for the purpose of reducing the frictional effect and for oil sealing.

According to another embodiment of the invention the oil discharge slot can be formed by an annular shoulder of the front surface of the bearing bush and the opposite wall of the bearing housing. This design also contributes towards a reduction of the manufacturing expenses, since consequently, the production of the oil discharge slot is accompanied by the finishing of the remaining surfaces of the bearing bush.

According to another advantageous feature of the invention the bearing housing is of a two-piece design comprising a housing body and a bearing flange attached thereto and the bearing bush is guided axially with a clearance between the housing body and the bearing flange and secured by radial abutments against a realtive rotation as compared with the bearing housing. Thus the entire bearing comprises essentially only three main parts, the centering and rapid disassembly of which presents no problems at all. Both the housing body and the bearing flange can be made of simple pressure castings having only few surfaces requiring finishing.

The finishing operation can be greatly simplified in the latter case according to the invention by the fact that the housing body and the bearing flange have concentrical gripping surfaces for the matching of the axially symmetrical fitting surfaces of the bearing in one setting each. Thus the two housing elements can be finished by turning in a single setting each. In addition to lower investment cost and manufacturing expenses for the component parts of the bearing housing, the provision of concentrical gripping surfaces makes it possible to avoid finish fillings of any kind, as a result of which a lesser degree of accuracy of fit becomes permissible and a highly accurate finish can be dispensed with. The finishing job is further facilitated by the use of turning tools of great stability and by the presence of large-sized chip escape chambers due to the large outside diameter on the damping surfaces.

BRIEF DESCRIPTION OF THE DRAWING

Further details of the invention will become apparent from the following description of a preferred embodiment of the invention with reference to the accompanying drawings wherein.

DESCRIPTION OF THE PREFERRED EMBODIMENT

Figure 1:
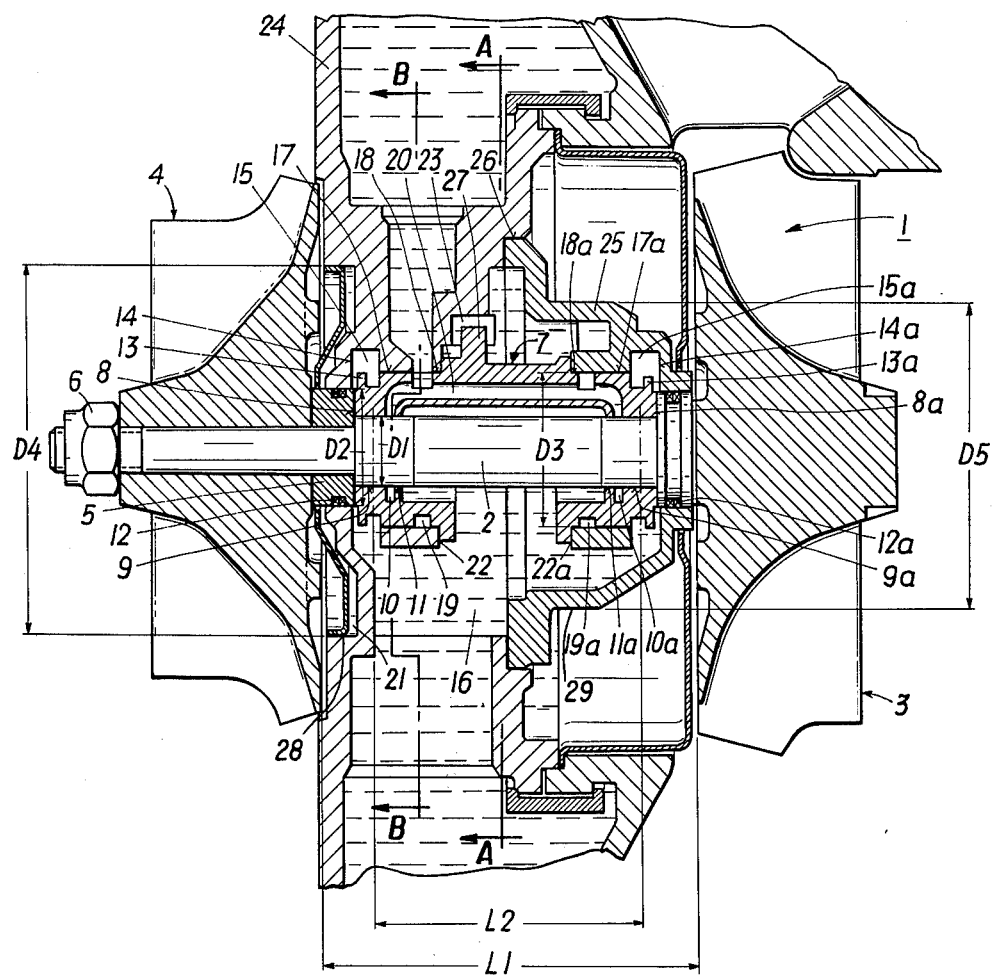
FIG. 1 is an axial cross-sectional view of a turbo-super charger wherein the rotor is carried in accordance with the present invention.

The rotor 1 with the shaft 2, the turbine rotor 3, the impeller compressor 4, the packing sleeve 5 and the shaft nut 6 is carried in a one-piece bearing bush 7 with two bearing supports, each comprising an axial bearing surface 8, 8a, a main radial bearing surface 9, 9a and a secondary radial bearing surface 11, 11a. At each bearing support the bearing bush 7 comprises an annular oil feed groove 10, 10a. Piston rings 12, 12a, for example, provide an oil seal for the bearing housing from the outside.

In order to obtain maximum axial distances for the effective bearing surfaces with predetermined wheel bases L 1 for example, according to the invention, the axial bearing surfaces 8, 8a are located very close to the shaft packing, for example within a distance of only two millimeters of the piston rings 12, 12a. Directly adjacent to the axial bearing surfaces 8, 8a the main radial bearing surfaces 9, 9a of the two bearing supports are arranged. The oil feed grooves 10, 10a and the secondary radial bearing surfaces 11, 11a are deliberately made of extreme axial shortness. This design makes it possible to provide considerably smaller bearing diameters D 1 and axial bearing external diameters D 2 and the narrowest radial bearing widths and oil-wetted surfaces on the rotor possible, and consequently, minimum frictional losses with adequate bearing and damping capacities of the bearings.

Owing to the asymmetric splitup of the radial bearing surfaces by means of the oil feed grooves 10, 10a into the main radial bearing surfaces 9, 9a and narrow secondary radial bearing surfaces 11, 11a, considerably smaller bearing widths are required for the same supporting power and damping properties than if the oil feed grooves were centrally arranged or with the types of bearings provided with oil bores. In addition thereto, the radial bearing of asymmetric design produces the largest possible effective distance between the two bearing supports.

The design of the bearing bush 7, made of high-quality casting, for example in such a manner as to include also all of the axial oil ducts 20, makes it possible to arrange the bearings 8, 8a 9, 9a at a considerably larger axial distance than the external damping surfaces 17, 17a and to design the annular oil lubricating grooves 10, arranged asymmetrically in relation to the radial bearing surfaces 9, 9a of extreme narrowness and radial depth.

Between the housing walls at the sealing collars 14, 14a and the opposite front walls of the bearing bush 7, oil outlet slots 13, 13a of a very small axial width are provided which are circumferentially open in the direction of adjacent oil discharge chambers 15, 15a and 16. The reason for the oil outlet slots 13, 13a being of such a narrow design is not to allow any splash oil to return to the rotor 1 against the oil spattering from the axial bearing. Besides, an underpressure is produced by the spattered oil on the piston rings 12, 12a provided for the sealing of shafts against the oil discharge chambers 15, 15a and 16. The width of the oil outlet slots 13, 13a is preferably smaller than approximately 10 to 20 percent of the bearing diameter D 1. The oil is returned via oil discharge chambers 15, 15a partly designed as annular grooves of the bearing bush 7. As an additional advantage as compared with symmetric bearings or bearings provided with oil bores, the contact with the rotor shaft produced by the quantities of oil discharged over the secondary radial bearing surfaces which can also be designed as packing points, is so small that they are able to receive only very little energy from the rotor.

The outer damping surfaces 17, 17a and 18, 18a are split up by means of the axially asymmetric arrangement of oil ring grooves 19, 19a provided for their lubrication, into a narrower axially inward portion and a larger axially outward portion. Preferably the share of the wider damping surfaces 17, 17a amounts to more than 75 percent of the entire damping surface. In order to improve the damping properties of the bearing, the damping surfaces 17 and 18 are more than three times the size of the bearing surfaces 9 and 11.

In the area of the sealing diameters the turbine rotors 3 and 4 are axially recessed to such an extent as is necessary in view of the required stability and the possibility of material removal for the balancing of the rotor members. On the compressor side for example, the axial space thereby gained is used for the separate supply of sealing gas via the chamber 21 for oil sealing, in the case of suction underpressure for example. At the turbine end it contributes toward the shortening of the wheel base L 1.

It is obviously possible to achieve in this manner, the design of bearings types of turbo-superchargers of axial lengths which, as expressed by the wheel-back distance L 1, are smaller than 70 percent of the possible maximum external diameter of the rotor. The corresponding values of conventional turbo-superchargers in serial production for passenger cars and trucks, however, are 90 percent, and generally over 100 percent. As a result of the design of the bearing according to the invention, effective bearing distances L 2 are attained which are larger than 55 percent and 70 percent respectively of the wheel distance L 1. The values of serially produced turbo-superchargers of conventional design and of the same size are approximately 40 to 50 percent. The axial overall length of the bearing housings, therefore, is considerably shortened as compared with known types, thereby resulting in samller bearing diameters.

Moreover, the design of the bearing according to the invention offers corresponding advantages of weight and space saving and additionally the manufacture of the relatively thin shaft of the rotor bending below feeding pressure is greatly facilitated.

Figure 2:
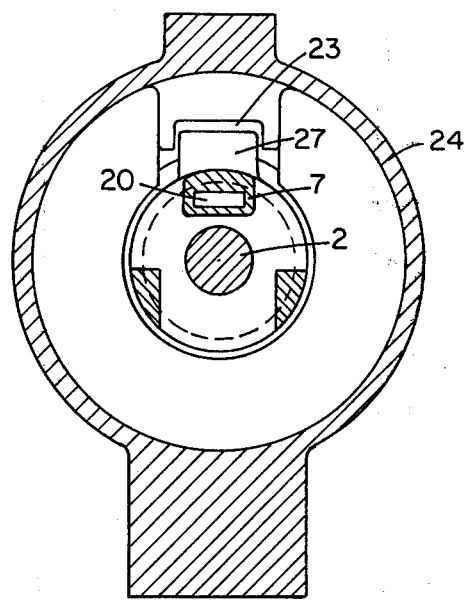
FIG. 2 is a section taken in the plane indicated by line A—A in FIG. 1.
Figure 3:
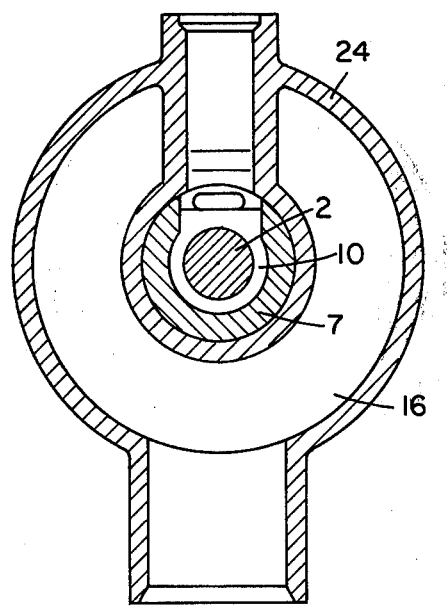
FIG. 3 is a section taken in the plane indicated by line B—B in FIG. 1.

On the bearing bush 7, not only are the above-mentioned bearing and damping surfaces provided, but also the collars 22, 22a serving for the axial fixation and radial abutment 27 cooperating with a counter-abutment 23 (see FIG. 2) to prevent the relative rotation of the bearing bush 7 against the bearing housing.

In the embodiment shown in the drawing, the bearing housing designed as a pressure casting for example, comprises a bearing body 24 and a bearing flange 25, adjoining an annular fitting area 26 of the housing body 24 which is concentric in relation to the rotor shaft 2. The bearing flange 25 also can be designed as a pressure casting, for example.

In the area of their diameters D 4, D 5 the housing body 24 as well as the bearing flange 25 have concentric gripping surfaces 28, 29. This makes it possible to finish the two housing members each in a single setting by turning, thereby considerably reducing finishing costs and completely avoiding any kind of machine-filling.

The invention is by no means restricted to the embodiment hereabove described and illustrated and can be used to equal advantage not only in connection with turbo-superchargers but also for the bearings of other rotors.

I claim:

1. A bearing for high-speed rotors, the rotors being mounted for rotation about an appropriate axis, comprising a bearing housing formed by a housing body and a bearing flange attached to said housing body and having cylindrical external damping surfaces in concentric relation to the rotor axis, a chamber containing lubricating oil arranged within said bearing housing, a one-piece bearing bush floating in lubricating oil arranged in said chamber bearing housing with an axial clearance therebetween, further cylindrical external damping surfaces in concentric relation to the rotor axis arranged on the circumference of said bearing bush and in engagement with said damping surfaces of the bearing housing, two bearing supports arranged on said bearing bush in an axially spaced relation to each other, each said bearing support including an axial bearing surface defined by an outer front surface of said bearing bush in normal relation to the rotor axis, and a radial bearing surface directly adjoining said axial bearing surface and formed by a bore in said bearing bush in concentric relation to the rotor axis, annular lubricating oil grooves each provided in said bearing bush in the area of said two radial bearing surfaces, each of said lubricating oil grooves dividing an associated said radial bearing surface into an axially inward narrower radial bearing portion and an axially outward larger radial bearing portion, lubricating oil ducts arranged in said bearing bush and interconnecting said two lubricating oil grooves and also connecting the same with said chamber in said bearing housing containing lubricating oil, and means for securing said bearing bush against any rotation in relation to said bearing housing, said means comprising a radial abutment on said bearing bush and counterabutment on said bearing housing which cooperates with said radial abutment on said bearing housing.

2. A bearing according to claim 1, wherein said lubricating oil grooves and lubricating oil ducts ae integral with said bearing bush.

3. A bearing according to claim 1, further comprising annular oil ring grooves each arranged on the external periphery of said bearing bush in the area of the outer damping surfaces, each of said oil ring grooves dividing the associated damping surface into an axially inward narrower surface portion and an axially outward larger surface portion.

4. A bearing according to claim 1, further comprising oil discharge chambers each surrounding said bearing bush in the area of said two bearing supports, one oil outlet slot each arranged concentrically around each axial bearing surface and open in the direction of said oil discharge chamber.

5. A bearing according to claim 4, wherein the oil outlet slot is formed by an annular shoulder on the front surface of said bearing bush and an opposite wall of said bearing housing.

6. A bearing according to claim 1, further comprising further concentrically arranged surfaces on said housing body and on said bearing flange, said further surfaces utilized during the finishing of all axially symmetrical fitting surfaces of the bearing in a single setting.

* * * * *